Patented May 5, 1931

1,804,354

UNITED STATES PATENT OFFICE

LEON LILIENFELD, OF VIENNA, AUSTRIA

CELLULOSE CONVERSION PRODUCTS AND PROCESS OF MAKING

No Drawing. Application filed May 10, 1924, Serial No. 712,477, and in Austria June 6, 1923.

The assiduous efforts which have been made to render fit for technical purposes those conversion products of cellulose which are produced by dissolving cellulose in strong sulphuric acid, have heretofore been practically without success. The direct working up of such solutions into technical products such as films, filaments and the like, was frustrated owing to the fact that in sulphuric acid solution the cellulose suffers a steady degradation which may, indeed, be retarded, but not stopped, by certain means, such as low temperatures, addition of weaker acids and the like. Continuing the action of the sulphuric acid until the degradation products are soluble in alkali, precipitating, washing and dissolving these in alkali, also proved to be an impracticable method, because the alkali-soluble conversion products of cellulose hitherto produced with the aid of strong sulphuric acid yielded technical products which were brittle in the dry state and had little tensile strength while wet.

This inconvenience, which hinders the utilization of the sulpholytic degradation products of cellulose, is eliminated by the present invention.

I have found that cellulose conversion products, the alkaline solutions of which yield transparent, pliable products resistant to tensile strain in the wet state, are obtained if the treatment of the cellulose with strong sulphuric acid is carried out at temperatures between $-9°$ C. and $+6°$ C. preferably between $-5°$ C. and $+5°$ C. for example between $-2°$ C. and $+2°$ C. Furthermore, I have found that for this purpose the proportions of sulphuric acid particularly suitable are such as contain not more than 6 and not less than 1.5, for example not more than 4 and not less than 2, parts by weight of sulphuric acid mono-hydrate to 1 part by weight of air-dry cellulose or of the cellulosic body used as parent material.

The present invention is based on the aforesaid discoveries.

The products separated by suitable precipitating agents from solutions or pastes or doughs obtained by treating cellulose, or conversion products adapted for the purpose, under the aforesaid conditions, dissolve completely in aqueous alkalies either at room temperature or at a temperature between $0°$ C. and room temperature or only at a temperature below $0°$ C. for example at $-5°$ C. to $-12°$ C. In the range of possibilities coming within the scope of the present invention are also included bodies which dissolve in aqueous alkalies only incompletely at room temperature and pass into complete solution only at a lower temperature. The differences in the behaviour of the cellulose conversion products obtainable according to the present process in respect of the dissolving temperature depend on the concentration and proportion of the sulphuric acid, the temperature applied in the sulpholytic operation and the duration thereof.

As rule of guidance, to which, however, the invention is not intended to be limited, it may be stated that the dissolving temperature in aqueous alkalies, for example caustic soda solution of 10 per cent. strength, rises with the proportion and concentration of the sulphuric acid, on the one hand, and with the temperature applied in the sulpholytic operation and the duration of the latter on the other hand. As an example it may be stated that, for instance, 3 to 4 parts by weight of sulphuric acid of $60°$ Baumé gravity to 1 part by weight of air-dry sulphite-cellulose at $-3°$ to $-5°$ C. and with a sulphuric acid reaction period of 1 to 2 hours, yield a product scarcely or only slightly soluble in caustic soda of 8 to 10 per cent. strength at room temperature; that the same proportion of sulphuric acid of the said strength at $-1°$ to $+1°$ C. and with a sulpholytic period of about 3 hours converts cellulose into a product partially soluble at room temperature; and that the same proportion of sulphuric acid of the same strength at $+5°$ C. and with a reaction period of the latter of ¾ to 2 hours yields a product completely, or for the greater part, soluble at room temperature.

If instead of cellulose, disintegrated cellulose is selected as parent material, for example mercerized or bleached or both mercerized and bleached cellulose or a cellulose which has been treated with a dilute acid (for example hydrochloric acid of ½ per cent. strength) at a raised temperature, then — with the same proportion and strength of the sulphuric acid and with the same sulpholytic period and at the same temperature—the tendency of the final product to dissolve in alkalies at room temperature is increased. If, therefore, it is desired to obtain products which are only partially or but slightly soluble or insoluble at room temperature, it is advisable to curtail the reaction period of the sulphuric acid, temperatures and proportions being otherwise the same.

The alkaline solutions of the products made according to the present process may be worked up into technical products such as films, artificial threads and the like which are resistant to tensile strain in the wet state, and flexible when dry.

The conduct of the process will now be described and a number of examples given for purposes of illustration. It is, however, expressly emphasized that it is not intended to limit the invention to the details of this description.

As parent materials for the process the following may be named by way of example:

(1) Bleached and unbleached cellulose of every kind and in every form in which it is available; (2) every kind of matter containing cellulose; (3) the cellulose conversion products which are formed by mechanical comminution of the cellulose in presence of water; (4) the cellulose conversion products obtained by treating cellulose with oxidizing or reducing bleaching agents; (5) the cellulose conversion products obtained by heating cellulose by itself or in presence of water or glycerine or salts of any kind at normal or increased pressure; (6) the cellulose conversion products (cellulose hydrates) produced by treating cellulose with alkali solution of various concentration (mercerized cellulose), with or without subsequent washing, with or without subsequent treatment with a dilute acid and with or without previous or subsequent or simultaneous treatment with bleaching or oxidizing agents; (7) the cellulose conversion products obtained by treating cellulose with a hot alkali; (8) the cellulose conversion products which may be obtained by separation from solutions of cellulose or cellulose hydrates or hydro-celluloses in ammoniacal cupric oxide or any other solvent containing copper as basis, or from solutions of cellulose or cellulose hydrates or hydro-celluloses in zinc halides, for example zinc chloride alone or in presence of acids or other salts or from cellulose xanthate solutions (when decomposed spontaneously or by other means); (9) artificial threads of every description, such as artificial silk, artificial silk waste, artificial cotton, staple fibre and the like, produced from cellulose or cellulose conversion products or cellulose derivatives; (10) the cellulose conversion products obtainable by treating cellulose or its conversion products with strong mineral acids, zinc chloride or ammoniacal cupric oxide but short of dissolution; (11) hydrocelluloses of every kind such as is obtained, for instance, by treating bleached or unbleached cellulose with dilute acids in the cold or at a raised temperature under ordinary or increased pressures or by drying in presence of acids; (12) oxycelluloses of every kind.

In the following description and claims, wheresoever the meaning admits, the term "cellulose" or "parent material" or "body of the cellulose group" or "cellulosic body" is intended to include any of the materials enumerated in the foregoing paragraph.

For carrying out the process the parent material (which may be previously cooled) is mixed with strong sulphuric acid suitably pre-cooled and, preferably while vigorously stirring, kneading (the kneading machine may also have a shredding effect) or beating, the mass is manipulated until there is produced (according to the proportion of sulphuric acid and temperature) a dough or a paste or stiff jelly or a thin paste or a solution. The sulphuric acid may be cooled from the first to the desired reaction temperature or lower. As the operation is exothermic, it is preferable to start with a sulphuric acid cooled to a temperature which is lower than that intended for the sulpholytic operation.

The sulphuric acid may be mixed with the parent material all at once or the parent material may be introduced gradually in large or small portions into the sulphuric acid.

The sulpholytic operation may be interrupted immediately the dough or the paste or the jelly or the thin paste or the solution is produced or has become homogeneous and contains no, or no substantial amounts of unaltered parent material, or it may be continued beyond this point.

On completion of the sulpholytic operation, the dough or the paste or the solution is mixed with a suitable precipitating agent, for example snow, ground ice, or ice water or a dilute acid, for example dilute sulphuric acid, which is preferably intensely cooled, or a preferably cooled salt solution, for example common salt or sodium sulphate solution or a dilute acid, for example dilute sulphuric acid containing some addition of salt, or an aqueous solution of an organic acid, for example acetic acid or benzene-sulphonic acid or phenolsulphonic acid or an alcohol, for example ethyl alcohol or methyl alcohol or the like, preferably while stirring, kneading, beating, willowing or shredding or the like. The precipitating agent required for the separation may be added or kneaded in, all at once or in small or large portions. As the proportion of precipitating agent, for example water, required for the precipitation is in general quite small, a very substantial portion of the sulphuric acid may be recovered in a highly concentrated form by pressing in efficient presses, for example hydraulic presses. The precipitated product which, according to the proportion of sulphuric acid used in the sulpholytic operation, the duration of this operation and the temperature during this operation, and according to the speed at which the precipitating agent is added, consists of loose and soft or more or less gelatinized portions, or of small hard lumps or films, is now washed, where desirable after previous removal of the mother liquor by pressing or centrifuging or filtering or straining or the like and, if necessary, comminuted by hand or in a suitable apparatus, for example a shredder, a mill or a meat-mincing machine or the like, once or several times, before, during or after washing. After washing, the product, preferably after previous pressing or centrifuging is rendered fit for technical use by dissolving it in alkali; or it may be previously dried in the air or in a vacuum, again comminuted and then dissolved in alkali.

The alkaline solutions (prepared, according to the properties of the product obtained, at room temperature or lower or below 0° C.) of the cellulose conversion products made according to the process may be used, where desired after previous filtering or straining or centrifuging, for the production of technical products, such as artificial threads and yarns (for example artificial silk, artificial cotton, staple fibre and the like) artificial hair, films of every kind, plastic masses, coatings of every kind on paper, textiles, leather and the like, finishings and fillings of fabrics, sizing for yarns, book-cloth, artificial leather and the like.

The solutions are easily worked up into technical products, because they can readily be coagulated by suitable precipitating baths, such as inorganic or organic acids, salts, alcohols, in some cases even water, or by heat, steam and the like.

The following examples illustrate the invention, the parts being by weight:

I. In 500 parts of a sulphuric acid of 60° Baumé gravity cooled to $-6°$ C. and contained in a large mortar or kneading machine or in a shredder, 100 parts of finely subdivided cellulose, for example sulphite-cellulose (which may be previously dried), are introduced in portions, but rapidly, while continuously kneading or stirring. During the introduction of the cellulose, which occupies 8 to 20 minutes, although the mortar or kneading machine is cooled the temperature rises to $+5°$ to $+5\frac{1}{2}°$ C. After the whole of the cellulose has been introduced, the fairly tough dough is further kneaded or stirred or mixed, care being taken at the same time that the temperature is kept at $+4°$ to $+5°$ C. After about 40 to 50 minutes reckoning from the moment at which the whole of the cellulose was introduced, the dough, which contains no or only quite few tiny portions of unaltered cellulose, is slowly mixed with snow or ground ice or a mixture of water with snow or ice while continuously kneading, whereby the conversion product is precipitated in the form of small lumps or films. Even relatively slight proportions of water (for example 350 to 1000 parts) suffice for precipitation.

Obviously, however, a much larger proportion of water may be used for this purpose. The precipitated body, if desired after previous pressing or centrifuging or filtering or straining and if desired after previous comminution by hand or in a suitable apparatus, for example a shredder, mill, beater or the like, is thoroughly washed with water. The washing operation may continue until a test portion of the body boiled with water yields no more sulphuric acid to the water. During the washing the body may be comminuted, that is to say triturated, shredded, ground or the like, once or several times. The washed product is then pressed or centrifuged. It may be used, that is to say dissolved in alkali, either in the moist state or after previous drying in a vacuum or in the air (which operation may be preceded by an exhaustion with alcohol). The product dissolves, for example, in caustic soda solution of 8 to 10 per cent. strength even at room temperature. A solution of 8 to 10 per cent. strength, if desired after previous straining or filtering, when spread on a glass plate and treated with dilute sulphuric acid (for example sulphuric acid of 10 to 20 per cent. strength) yields a transparent film, which gains in strength in the wet state and in flexibility when dry if the product is dissolved, instead of at room temperature, at a lower temperature, for example at $-5°$ to $-10°$ C. or if the solution completed at room temperature is cooled to a lower temperature.

II. Into 500 parts of a sulphuric acid of 60° Baumé gravity cooled to $-15°$ C. and contained in a large mortar or kneading machine or a shredder, 100 parts of finely subdivided cellulose, for example sulphite-cellulose (which may previously be dried), are introduced, while continuously kneading or stirring, gradually and in such a manner that the whole of the cellulose is incorporated with the sulphuric acid in the course of half an hour. During the introduction of the cellulose the temperature rises gradually to −7° C. After the whole of the cellulose has been introduced, the tough dough, still containing particles of unchanged cellulose is further kneaded while cooling, and the cooling is so adjusted that after about a ¼ to ½ hour the temperature of the doughly mass has risen to 0° to −1° C., at which temperature the mass is kept, while continuously kneading or stirring or shredding for another ½ hour to ¾ hour. After this period has elapsed, snow or ground ice or a mixture of water with snow or ice is kneaded, in portions but rapidly, into the homogeneous dough, until precipitation occurs, that is to say until the dough is broken up more or less into tough lumps or films or shreds. The further manipulation is as described in Example I.

The body is partially soluble in alkali solution, for example caustic soda solution of a 8 to 10 per cent. strength, at room temperature. A considerable portion of the substance remains undissolved in the form of large or small swollen lumps. Only on cooling to about 0° C. or lower, for example to −5° to −10° C. is a practically complete solution obtained. Such a solution, for example of 5 to 10 per cent. strength, when spread on a glass plate and treated with dilute sulphuric acid yields a film which is strong while wet and flexible when dry. Passed through a fine opening into dilute sulphuric acid or any other suitable precipitating bath (any of the precipitating baths known in the viscose art may be applied), the solution may be spun, yielding a filament which is clear and resistant to tensile strain in the wet state and lustrous when dry.

III. Into 500 parts of a sulphuric acid of 60° Baumé gravity cooled to −20° C. and contained in a large mortar or kneading machine or a shredder, 100 parts of finely subdivided cellulose, for example sulphite cellulose (if necessary previously dried) are introduced. The introduction of the entire quantity of cellulose occupies 20 to 30 minutes. During the introduction the temperature rises to −10° to −11° C. After the whole of the cellulose is incorporated in the sulphuric acid, the mass is kneaded or stirred or shredded for 1 to 1½ hours, care being taken to keep the temperature during this period at −5° to −7° C. After this period, snow or ground ice or a mixture of water with snow or ice is kneaded in slowly, in portions, until precipitation occurs, that is to say until the product is precipitated in rigid, tough, partially skinny, partially shreddy, partially lumpy pieces, which can, however, be triturated. The further manipulation is as described in Example I.

The final product is soluble in part in alkali solution, for example caustic soda solution of 5 to 10 per cent. strength at room temperature. A part remains undissolved in the form of swollen portions. Only on cooling to a lower temperature, for example to −5° to −11° C., is a practically complete solution produced which, if necessary after previous straining or filtering, spread on a glass plate and treated with dilute sulphuric acid yields a film which is resistant to tensile strain in the wet state, flexible when dry; the solution is also capable of being spun into clear threads resistant to tensile strain.

IV. The mode of operation is as in Examples I, II, III, except that the dough is precipitated by mixing rapidly with a large proportion of snow water or ice water while kneading or shredding or beating.

The result, according to the temperature, is approximately the same as in Example I or II or III.

Into 300 to 350 parts of a sulphuric acid of 60° Baumé gravity, cooled to −15 to −20° C. and contained in a large mortar or kneading machine, or shredder, 100 parts of finely subdivided cellulose, for example sulphite-cellulose, preferably previously dried, are introduced while continuously kneading or shedding. The introduction of the whole of the cellulose occupies ½ to 1 hour. During the introduction the temperature rises to −5° to −9° C. After the whole of the cellulose has been introduced, the tough dough, still containing undissolved portions of cellulose, is further kneaded or beaten and, at the same time, the cooling is so arranged that after some 20 to 45 minutes the temperature of the dough has risen to −1° to −2° C., at which temperature it is kneaded or shredded for another hour up to 1½ hours. The tough dough is then mixed gradually, while continuously stirring or kneading, with snow or ground ice or a mixture of water with snow or ice. This precipitates or disintegrates the dough into more or less rigid lumps or films or shreds. The further working up is as described in Example I.

In dilute alkali solution for example caustic soda solution of 8 to 10 per cent. strength, the product is soluble, at room temperature, only to a very slight degree. The main mass is swollen to a vitreous form. Only on cooling to below room temperature for example to −5° to −11° C. does practically complete dissolution occur. Spread on a glass plate and treated with dilute sulphuric acid, a solution of 6 to 10 per cent. strength yields a film which is resistant to tensile strain while wet, flexible when dry, and capable of being spun into clear threads which are resistant to tensile strain.

VI. The mode of operation is as described in Example V, except that after the whole of the cellulose has been incorporated with the sulphuric acid, the subsequent kneading or subsequent shredding is so conducted that after about ½ to ¾ hour the temperature of the mass rises to +1° to +3° C. and it is kneaded or shredded at this temperature for 1 to 1½ hours. There is obtained a product which is soluble to a considerable extent in caustic soda solution of 8 to 10 per cent strength at room temperature; at a lower temperature, for example at 0° C. or −5° to −11° C. It passes into practically complete solution. A solution of 6 to 10 per cent strength, when spread on a glass plate and treated with dilute sulphuric acid yields a film which is resistant to tensile strain in the wet state, flexible when dry and capable of being spun into clear threads which are resistant to tensile strain.

VII. The mode of operation is as in Example V or VI, except that the dough is precipitated by mixing rapidly with a large proportion of snow water while simultaneously kneading or shredding or beating. The result, according to the temperature, is approximately the same as in Example V or VI.

VIII. The mode of operation is as in Examples I to VII, except that instead of not disintegrated cellulose, 100 parts or a quantity corresponding with 100 parts of the parent material, of the following initial materials are used:

(1) Bleached cotton in the form of medicated cotton wool, (2) Mercerized cellulose made, for example in the following manner:

100 parts of sulphite-cellulose in fleece or sheet form or medicated cotton wool are impregnated with 900 to 1000 parts of a caustic soda solution of 18 to 30 per cent strength of room temperature and left in the caustic soda solution for 6 up to 24 hours; the mass is then immediately washed or pressed or centrifuged until it weighs 200 to 300 parts and opened up or comminuted in a suitable apparatus (for example shredder, beater, scutcher or the like) and washed with cold or hot water either immediately after comminution or after standing for 1 to 3 days at room temperature. The washed mercerized cellulose is then pressed or centrifuged and dried in a vacuum or in the air.

(3) Cellulose comminuted or ground in presence of water and produced, for example, in the following manner:

200 parts of sulphite-cellulose in fleece or sheet form are stirred with 10 to 20 times its weight of water until the mixture is homogeneous and after standing for several hours or for several days at room temperature it is pressed or centrifuged until it weighs 250 to 350 parts. The product is then ground or comminuted in a suitable apparatus (for example a shredder, beater, willowing machine or the like) for several hours up to 8 days and, if desired, dried.

(4) Cellulose previously treated with dilute mineral acid according to the following directions:

100 parts of bleached or unbleached sulphite cellulose are boiled with 1000 or 4000 parts of hydrochloric acid of ½ per cent strength, in an open vessel for ½ to 3 hours; the mass, where desired after previous pressing or centrifuging, is then washed with water until free from hydrochloric acid and pressed or centrifuged and dried.

(5) Viscose silk or copper silk or waste of such silks.

(6) Cellulose hydrate obtained from viscose by precipitation or treatment in the dissolved or undissolved state (that is sulphidized alkali-cellulose before its dissolution) with a dilute mineral acid, for example sulphuric acid of 5 per cent strength, washing the precipitate and drying.

The results correspond more or less with those obtained in Examples I–VII.

In the following claims the expression "technical products" is intended to include: artificial threads and yarns (for example, artificial silk, artificial cotton, staple fibre and the like), artificial hair, films of every kind, plastic masses, coatings of every kind on paper, textile material, leather and the like, finishings and fillings of fabrics, sizings of yarns, book-cloth, artificial leather and the like.

Sulpholytic, as above used, means pertaining to decomposition or depolymerization by means of sulphuric acid; thus, sulpholytic action means a decomposition or depolymerization produced by sulphuric acid.

I claim:

1. Process for making cellulose conversion products, which may be worked up into technical products by dissolution in aqueous alkali solution and precipitation from the solution, which process comprises treating a cellulosic body with strong sulphuric acid of at least about 60° Baumé at a temperature between about minus 5° C. and plus 6° C. and continuing such treatment until a conversion product of cellulose soluble in aqueous caustic alkali solution is obtained.

2. Process for making cellulose conversion products, which may be worked up into technical products by dissolution in aqueous alkali solution and precipitation from the solution, which process comprises treating a cellulosic body with strong sulphuric acid of at least about 60° Baumé at a temperature between minus 2° C. and plus 2° C. and continuing such treatment until a conversion product of cellulose soluble in aqueous caustic alkali solution is obtained.

3. Process for making cellulose conversion products, which may be worked up into technical products by dissolution in aqueous alkali solution and precipitation from the solution, which process comprises treating at a temperature between minus 5° C. and plus 5° C. a cellulosic body with strong sulphuric acid of at least about 60° Baumé in such a proportion that not more than 6 and not less than 1.5 parts by weight of $H_2SO_4$ are used to 1 part by weight of air-dry cellulosic body and continuing such treatment until a conversion product of cellulose soluble in aqueous caustic alkali solution is obtained.

4. Process for making cellulose conversion products, which may be worked up into technical products by dissolution in aqueous alkali solution and precipitation from the solution, which process comprises treating at a temperature between minus 5° C. and plus 5° C. a cellulosic body with strong sulphuric acid of at least about 60° Baumé in such a proportion that not more than 4 and not less than 2 parts by weight of $H_2SO_4$ are used to 1 part by weight of air-dry cellulosic body and continuing such treatment until a conversion product of cellulose soluble in aqueous caustic alkali solution is obtained.

5. Process for making cellulose conversion products, which may be worked up into technical products by dissolution in aqueous alkali solution and precipitation from the solution, which process comprises treating a cellulosic body with strong sulphuric acid at a temperature between about minus 5° C. and plus 6° C. until a conversion product of cellulose soluble in aqueous caustic alkali solution is obtained and thereafter precipitating the cellulose conversion product and washing the precipitated substance.

6. Process for making cellulose conversion products, which may be worked up into technical products by dissolution in aqueous alkali solution and precipitation from the solution, which process comprises treating a cellulosic body with strong sulphuric acid at a temperature between minus 5° C. and plus 5° C. until a conversion product of cellulose soluble in aqueous caustic alkali is obtained and thereafter precipitating the cellulose conversion product and washing the precipitated substance.

7. Process for making cellulose conversion products, which may be worked up into technical products by dissolution in aqueous alkali solution and precipitation from the solution, which process comprises treating a cellulosic body with strong sulphuric acid at a temperature between minus 2° C. and plus 2° C. until a conversion product of cellulose soluble in aqueous caustic alkali solution is obtained and thereafter precipitating the cellulose conversion product and washing the precipitated substance.

8. Process for making cellulose conversion products, which may be worked up into technical products by dissolution in aqueous alkali solution and precipitation from the solution, which process comprises treating at a temperature between minus 5° C. and plus 5° C. a cellulosic body with strong sulphuric acid in such a proportion that not more than 6 and not less than 1.5 parts by weight of $H_2SO_4$ are used to 1 part by weight of air-dry cellulosic body until a conversion product of cellulose soluble in aqueous caustic alkali solution is obtained and thereafter precipitating the cellulose conversion product and washing the precipitated substance.

9. Process for making cellulose conversion products, which may be worked up into technical products by dissolution in aqueous alkali solution and precipitation from the solution, which process comprises treating at a temperature between minus 5° C. and plus 5° C. a cellulosic body with strong sulphuric acid in such a proportion that not more than 4 and not less than 2 parts by weight of $H_2SO_4$ are used to 1 part by weight of air-dry cellulose body, until a conversion product of cellulose soluble in aqueous caustic alkali solution is obtained and thereafter precipitating the cellulose conversion product and washing the precipitated substance.

10. The process for making cellulose products, which may be worked up into technical products by dissolution in aqueous caustic alkali solution and precipitation from the solution, which comprises treating at a temperature between substantially minus 5° C. and substantially plus 6° C. a cellulosic body with sulphuric acid of at least substantially 60° Bé. strength in such proportion that not more than substantially 6 and not less than substantially 1.5 parts by weight of sulphuric acid mono-hydrate are used to 1 part by weight of air dry cellulosic body and continuing such treatment until a conversion product of cellulose soluble in aqueous caustic alkali solution is obtained.

11. Sulpholytic conversion products of cellulose which are soluble in aqueous caustic alkali solution, and which, when brought into solution in aqueous caustic alkali and into the form of technical products and coagulation thereof produced, are tough or tenacious and flexible when dry, and resistant to tensile strain in the wet state.

12. Sulpholytic conversion products of cellulose which are soluble in aqueous caustic alkali solution below room temperature, and which, when brought into solution in aqueous caustic alkali solution and into the form of technical products and coagulation thereof produced, are tough or tenacious and flexible when dry, and resistant to tensile strain in the wet state.

13. An artificial product composed essentially of a sulpholytic conversion product of cellulose soluble in aqueous caustic alkalies, the sulpholytic conversion product in said artificial product being tough and supple in the dry state.

14. An artificial product composed essentially of a sulpholytic conversion product of cellulose soluble in aqueous caustic alkalies, the sulpholytic conversion product in said artificial product being tough and supple in the dry state, and being soluble in aqueous caustic alkalies at temperatures below room temperatures.

15. A sulpholytic conversion product of cellulose which is soluble in aqueous caustic alkali solution and which when separated as a film from an aqueous caustic alkali solution is resistant to tensile strain in the wet state and is flexible when dry.

In testimony whereof I affix my signature.

Dr. LEON LILIENFELD.